United States Patent
Quignard et al.

(10) Patent No.: US 8,623,102 B2
(45) Date of Patent: Jan. 7, 2014

(54) PROCESS FOR DIRECT HYDORLIQUEFACTION OF BIOMASS COMPRISING TWO STAGES OF EBULLATING BED HYDROCONVERSION

(75) Inventors: Alain Quignard, Roussillon (FR); Wilfried Weiss, Lyons (FR)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 393 days.

(21) Appl. No.: 13/004,304

(22) Filed: Jan. 11, 2011

(65) Prior Publication Data
US 2011/0167713 A1 Jul. 14, 2011

(30) Foreign Application Priority Data

Jan. 12, 2010 (FR) ...................................... 10 00097
Feb. 11, 2010 (FR) ...................................... 10 00574

(51) Int. Cl.
*C10L 1/00* (2006.01)
(52) U.S. Cl.
USPC ........................................................... 44/307
(58) Field of Classification Search
USPC ............... 585/240, 252; 208/27; 44/307, 308; 554/141, 144, 145
See application file for complete search history.

(56) References Cited

U.S. PATENT DOCUMENTS 7,999,142 B2 * 8/2011 Kalnes et al. ................. 585/240
2011/0042267 A1 * 2/2011 Hayasaka ....................... 208/27

FOREIGN PATENT DOCUMENTS

JP          2008029282      *   2/2008

* cited by examiner

*Primary Examiner* — Prem C Singh
*Assistant Examiner* — Chantel Graham
(74) *Attorney, Agent, or Firm* — Millen, White, Zelano & Branigan, P.C.

(57) ABSTRACT

A process for direct hydroliquefaction of biomass selected from algae, lignocellulosic biomass and/or of one or more constituents of lignocellulosic biomass selected from the group comprising cellulose, hemicellulose and/or lignin for producing fuel bases comprising two successive hydroconversion stages under high hydrogen pressure in ebullating bed reactors. Hydroconversion takes place in the presence of a supported catalyst of the type for hydroconversion of petroleum residue and a suspension composed of the biomass and a solvent, preferably a hydrogen donor solvent and preferably recycled from the process. The biomass can undergo a pretreatment of drying and/or roasting and/or grinding and/or demineralization prior to hydroliquefaction.

23 Claims, 1 Drawing Sheet

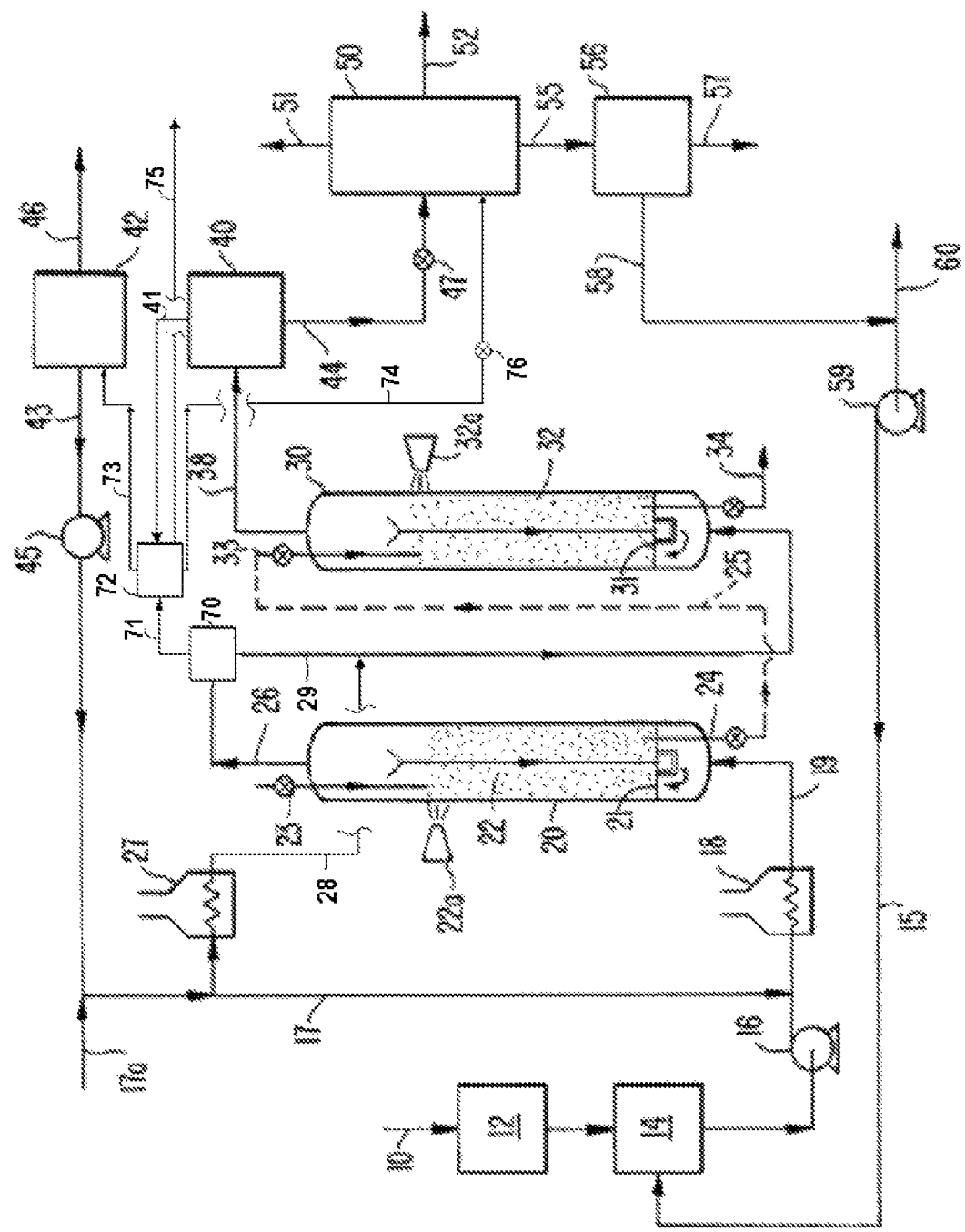

PROCESS FOR DIRECT HYDROLIQUEFACTION OF BIOMASS COMPRISING TWO STAGES OF EBULLATING BED HYDROCONVERSION

The present invention relates to a process for direct hydroliquefaction of biomass selected from algae, lignocellulosic biomass and/or of one or more constituents of lignocellulosic biomass selected from the group comprising cellulose, hemicellulose and/or lignin for producing fuel bases. More particularly, the invention relates to a process comprising two successive hydroconversion stages using ebullating bed technology under high hydrogen pressure.

For some years there has been an upsurge of interest in incorporating products of renewable origin in the fuel and chemical industries, to supplement or replace products of fossil origin. One possible route is the conversion of lignocellulosic biomass or algae to fuel bases.

Lignocellulosic biomass consists essentially of three natural polymers: cellulose, hemicellulose and lignin. Cellulose and hemicellulose are essentially composed of sugar polymers (hexoses and pentoses). Lignin is essentially composed of crosslinked polymers comprising elementary units of the propyl-methoxy-phenol type.

Within the context of the production of biofuels from algae, it is possible to distinguish macroalgae and microalgae. By macroalgae is meant the large algae or giant algae that are fixed on a rocky substrate, with the exception of marine gulfweeds that float unattached. Macroalgae are essentially constituted by proteins and polysaccharides, such as alginates or alginic acid, and minerals. The term microalgae is used to denote microscopic algae in the strict meaning of the term (diatoms, chlorophyceae, etc.) and cyanobacteria. These are undifferentiated single-cell or multicell microorganisms living in highly aqueous environments and capable of flagellar motility. The microalgae are essentially constituted by proteins, lipids, polysaccharides and fibres.

For simplicity, the term biomass used hereinafter encompasses algae, lignocellulosic biomass and/or one or more constituents of lignocellulosic biomass selected from the group comprising cellulose, hemicellulose and/or lignin.

Biomass has an elemental composition rich in carbon and oxygen but relatively poor in hydrogen. For producing fuel bases from biomass it is therefore generally necessary to lower the oxygen content and increase the hydrogen content and/or reduce the carbon content. Biomass also contains other heteroatoms (sulphur, nitrogen etc.) and inorganic compounds of various kinds (alkalis, transition metals, halogens etc.).

There are various methods for conversion of biomass. One method for converting biomass is gasification followed by production of a fuel from synthesis gas. Another method of transformation is liquefaction, for example rapid pyrolysis or hydrothermal conversion, with or without catalyst, but without addition of hydrogen. However, these processes lead to bio-oils that are still very rich in oxygen, have low or no thermal stability and have physicochemical properties that are still very remote from those required for the end products and therefore require further treatment. Moreover, these purely thermal processes essentially have very poor selectivity and these reactions may be accompanied by considerable production of gases and solids.

A new solution for liquefaction of biomass that is potentially attractive consists of liquefying by means of a catalytic process in the presence of hydrogen and a solvent, preferably a hydrogen donor solvent. This route permits notable direct incorporation of hydrogen. The principle of direct hydroliquefaction therefore consists of bringing biomass into contact with a solvent that can display hydrogen donor character, and of selecting the various operating parameters, i.e. solvent/feed ratio, temperature, total pressure, partial pressure of reducing gas, presence of catalyst, in order to produce an organic liquid having a reduced oxygen content and an H/C molar ratio close to that of hydrocarbons. Catalytic hydroliquefaction is easier with lower water content of the biomass and if it is in the state of finely-divided particles, hence the interest in operations of drying and/or grinding and/or roasting and/or demineralization.

An interesting application is hydroliquefaction of lignin, as this constituent of lignocellulosic biomass, when it is separated, is at present only upgraded as a fuel.

In the direct hydroliquefaction of biomass, the reactions in the reactor or reactors are as follows:
deoxygenation reactions, which can be divided into:
the decarbonylation reaction, which represents all of the reactions for removing an oxygen atom and a carbon atom from a carboxyl group, forming carbon monoxide (CO),
the decarboxylation reaction, which represents all of the reactions for removing a carboxyl group from a carboxylic group, forming carbon dioxide ($CO_2$),
the hydrodeoxygenation reaction (HDO) which corresponds to the reactions for removing oxygen from the feed and ends in the formation of water in the presence of hydrogen,
the hydrodesulphurization reaction (HDS), which denotes the reactions for removing sulphur from the feed with production of $H_2S$,
the hydrodenitrogenation reaction (HDN), which denotes the reactions for removing nitrogen from the feed with production of $NH_3$,
the reaction of hydrogenation of the unsaturations and/or of aromatic rings (HDol, HDA),
more generally all the reactions for hydrotreating (HDT),
the hydrocracking reactions, which lead to opening of the naphthene ring or fractionation of paraffins into several fragments of lower molecular weight (HCK),
the thermal cracking and polycondensation (coke formation) reactions, although the latter are undesirable,
water gas shift conversion reactions: $CO + H_2O \rightarrow CO_2 + H_2$
methanation reactions: $CO + 3H_2 \rightarrow CH_4 + H_2O$ All reactions using hydrogen can be based on molecular hydrogen such as on reactions of hydrogen atom transfer between the hydrogen donor solvent or the products of conversion (since the donor solvent can be derived from certain families of recycled conversion products) and the reactants.

The catalysts used for hydroliquefaction of biomass are preferably known catalysts for hydroconversion of residues in the petroleum industry. Hydroconversion means the hydrotreating and/or hydrocracking reactions.

Since the first oil crisis in the 1970s, direct hydroliquefaction of biomass has appeared as a potential route for production of fuels and/or chemicals.

Thus, U.S. Pat. No. 4,420,644 describes a process for liquefaction of lignin for producing phenols in an ebullating bed reactor, operating at pressures from 500 to 2500 psig (3.4 MPa-17.2 MPa). The liquid effluent from liquefaction then undergoes a hydroalkylation stage in order to increase the yield of phenols. Patent application CA851708 from the same applicant describes a process for liquefaction of lignin in an ebullating bed reactor for producing phenols, operating at pressures from 250 to 1800 psig (1.7 MPa-12.4 MPa). This application describes the possibility of reactors in series but without giving further details of the operating conditions in the various stages.

More recently, application US2008/0076945 describes a process for hydroliquefaction of lignin and cellulosic waste into fuel products (diesel and naphtha) in a single stage, operating at relatively moderate pressures from 3.4 MPa to 14 MPa. Applications US2009/0218061 and US2009/0218062 disclose a process for hydroliquefaction of lignin and/or of black liquor into biofuels, operating at a pressure of 2000 psig (13.8 MPa). A multistage process is described in the case of a feed of black liquor, with the first hydroconversion stage essentially carrying out separation of the lignin from the water and salts contained in the liquor.

Suzuki et al. (Fuel Vol. 76, No 11, pp. 1043-1048, 1997) describe hydroliquefaction of microalgae with a sulphurized iron catalyst ($Fe(CO)_5$—S in an autoclave at a temperature between 300° C. and 425° C. and at 5 Mpa hydrogen pressure. The same authors also describe co-hydroliquefaction of microalgae with carbon, using unsupported iron, molybdenum or cobalt catalysts in an autoclave at a temperature between 300 and 400° C. and a pressure of 5 Mpa (Energy and Fuels 2001, 15, 350-355).

Chin L-Y (Chin L-Y, Fuels by algae hydrogenation (1979) Ph.D. thesis at the Pennsylvania State University) describes hydroliquefaction of microalgae (*Chlorella pyrenoidosa*) in a slurry reactor in the presence of a molybdenum cobalt catalyst at a temperature between 340° C. and 430° C. at a pressure between 7 and 15 Mpa. The technologies of hydroconversion in a slurry reactor use a dispersed catalyst in the form of very small particles. The catalysts or their precursors are injected with the feed to be converted at the entry to the reactor, pass through the reactor with the feeds and the products in the process of conversion, then are conveyed with the reaction products out of the reactor. The use of a slurry reactor then requires the separation of the catalyst and the effluent. Therefore slurry methods suffer from operational difficulty.

The challenge for the industrial development of hydroliquefaction is to obtain biofuels at high yield and of acceptable quality with respect to the final specifications and/or the constraints associated with the later stages of processing.

The present invention relates to a process for direct hydroliquefaction of biomass for producing fuel bases comprising two successive hydroconversion stages using ebullating bed technology under high hydrogen pressure.

More particularly, the present invention relates to a process for hydroliquefaction of biomass selected from algae, lignocellulosic biomass and/or of one or more constituents of lignocellulosic biomass selected from the group comprising cellulose, hemicellulose and/or lignin for producing fuel bases comprising a) a stage of preparing a suspension of particles of biomass in a solvent, preferably a hydrogen donor solvent, b) a first stage of hydroconversion in the presence of hydrogen of said suspension in at least one reactor containing an ebullating bed catalyst and operating at a temperature comprised between 300° C. and 440° C., preferably comprised between 325° C. and 375° C., at a total pressure comprised between 15 and 25 MPa, preferably comprised between 16 and 20 MPa, at an hourly mass velocity ((t of feed/h)/t of catalyst) comprised between 0.1 and 5 $h^{-1}$ and at a hydrogen/feed ratio comprised between 0.1 and 2 $Nm^3/kg$, c) a second stage of hydroconversion in the presence of hydrogen of at least a proportion of the effluent obtained in stage b) in at least one reactor containing an ebullating bed catalyst and operating at a temperature comprised between 350° C. and 470° C., preferably comprised between 350° C. and 425° C. at a total pressure comprised between 15 and 25 MPa, preferably comprised between 16 and 20 MPa, at an hourly mass velocity ((t of feed/h)/t of catalyst) comprised between 0.1 and 5 $h^{-1}$ and at a hydrogen/feed ratio comprised between 0.1 and 2 $Nm^3/kg$.

More particularly, the invention relates to a process for direct hydroliquefaction of biomass comprising two successive hydroconversion stages under high hydrogen pressure in ebullating bed reactors. The lignocellulosic biomass preferably undergoes a pretreatment of drying and/or roasting and/or grinding prior to hydroliquefaction. The algae preferably undergoes a pretreatment of demineralization and/or drying and/or grinding. The first hydroconversion stage (1) takes place in the presence of a supported catalyst of the type for hydroconversion of petroleum residue and a suspension composed of biomass and a solvent, preferably a hydrogen donor solvent. Said solvent is preferably a recycled cut obtained from the process and advantageously contains a cut of the vacuum gas oil type. The solvent has a triple role: slurry suspension of the feed upstream of the reaction zone, thus enabling it to be transported to the latter, then partial dissolution of primary products from conversion and transfer of hydrogen to these primary products to permit conversion to a liquid, minimizing the quantity of solids and gases formed in said reaction zone.

The second hydroconversion stage (2) also takes place in the presence of a supported catalyst of the type for hydroconversion of petroleum residue and with at least a proportion of the effluent from stage (1). The temperature of the reactor in stage (1) is lower than that of the reactor in stage (2), which promotes hydrogenation of the solvent. Thus, there is deeper hydroconversion in the reactor in stage (2). At the end of the two hydroconversion stages, the effluent is generally subjected to a separation stage for recovering the desired fuel bases. This separation stage can comprise one or more unit operations such as a gas/liquid separator, atmospheric distillation, vacuum distillation, liquid/liquid extraction, filtration, centrifugation. These unit operations can be carried out on one or more streams from the hydroconversion stages and/or from unit operation(s) for separation located upstream.

The products obtained by hydroliquefaction of biomass, after optional separation, are light gases (C1-C4, $CO_2$, CO, $H_2O$, $H_2S$, $NH_3$ etc.), an aqueous phase which may contain oxygen-containing compounds (in particular phenols), liquid hydrocarbons of the naphtha, kerosene and diesel type, a heavy fraction of the vacuum gas oil type preferably serving at least partially as liquefaction solvent and a residual fraction.

It has now been found that the hydroliquefaction process of the present invention, integrating ebullating bed technology in, two stages operating at different temperatures and working under high hydrogen pressure, makes it possible to achieve remarkable levels of conversion to biofuels. The liquefied products obtained are of good quality with an oxygen content generally comprised between 0.1 and 5% depending on the treatment severity. In fact, the high hydrogen pressure gives better deoxygenation of the biomass, making it possible, for example, to reduce the production of phenols and increase the degree of conversion and quality of the biofuels obtained.

By using ebullating bed technology it becomes possible to work under constant operating conditions and obtain yields and product qualities that are constant throughout the cycle. Implementation of ebullating bed hydroliquefaction makes it possible to avoid problems of contamination of the catalyst connected with the formation of water and oxides of carbon by the hydrodeoxygenation reactions and with the deposits of impurities that are present naturally in lignocellulosic biomass. The ebullating bed also permits almost isothermal operation, which is an advantage for strongly exothermic reactions such as hydrodeoxygenation. Likewise, as the catalyst remains in the reactor, no problem is encountered for the separation of the catalyst from the effluent after hydroconversion as for a slurry reactor. Slurry reactor hydroconversion techniques of course use a dispersed catalyst in the form of very small particles, the size of which is of a few tens of microns or less (generally 0.001 to 100 µm). The catalysts or their precursors are injected at the entry to the reactors, with the feed to be converted. The catalysts pass through the reactors with the feeds and the products in the process of conversion, then they are conveyed with the reaction products out of the reactors. They are found in the heavy residual fraction after separation.

The ebullating bed technology also means that conversion of biomass can also be carried out in co-processing with other feeds. These feeds can be of hydrocarbon (petroleum) nature, of non-petroleum nature, such as coal, industrial waste or household or industrial organic waste, or of renewable nature such as oils and fats of vegetable or animal origin. An advantage of co-processing is that feeds often regarded as waste can be upgraded to fuel bases.

The use of two ebullating bed reactors gives improved operability in terms of flexibility of the operating conditions and of the catalytic system. The various possibilities for treatment of spent catalysts described below by regeneration and/or rejuvenation and/or cascading make it possible to increase the life of the catalysts as well as the cycle times of the entire process.

The different operating conditions in terms of temperature in the two hydroconversion stages are selected so as to be able to control the hydrogenation and conversion of the biomass into desired products in each reactor and simultaneously convert the biomass, the recycled solvent and the liquids derived from the biomass during hydroliquefaction. The different operating conditions thus permit optimization of the use of hydrogen. The lower temperature in the first hydroconversion reactor limits the formation of coke and the polymerization reactions while promoting hydrogenation of the solvent. Hydrogenation of the solvent facilitates the transfer of hydrogen between the solvent and the biomass and/or the conversion products throughout hydroconversion. The higher temperature in the second hydroconversion reactor makes it possible to convert the biomass that has not yet been converted. Therefore it is the choice of these different operating conditions coupled with the use of a two-stage process of hydroconversion that makes it possible to produce fuel bases at good yield and with an excellent degree of deoxygenation, which is reflected in the good quality of the fuels.

Another advantage of the present invention resides in the optional pretreatment of the biomass, which provides optimum preparation of the biomass in terms of moisture content and particle size for its hydroliquefaction. The pretreatment of the lignocellulosic biomass or one of its constituents can comprise a drying and/or roasting and/or grinding stage. Drying consists of reducing the water content of the feed, thus permitting grinding at lower energy cost. Roasting provides a further decrease in water content and modification of the structure of the biomass, permitting grinding at lower energy cost than for a feed that has only been dried. The grinding stage can also take place after drying and can optionally be supplemented with additional grinding after roasting. Pretreatment of the algae can comprise a demineralization and/or drying and/or grinding stage. Demineralization consists of reducing the content of impurities, in particular of inorganic salts and metals.

DETAILED DESCRIPTION

The present invention relates to a process for direct hydroliquefaction of biomass, alone or mixed, for producing fuel bases. More particularly, the invention relates to a process comprising two successive hydroconversion stages using ebullating bed technology under high hydrogen pressure.

The Biomass Feed

The biomass feed can be selected from algae, lignocellulosic biomass and/or of one or more constituents of lignocellulosic biomass selected from the group comprising cellulose, hemicellulose and/or lignin.

"Lignocellulosic biomass" means feeds rich in cellulose and/or hemicellulose and/or lignin. Only one of the constituents of this lignocellulosic biomass can be extracted for hydroliquefaction. This extract or the other remaining fraction can also constitute a feed usable in the invention, in particular lignin.

The lignocellulosic raw material can consist of wood or of vegetable waste. Other non-limiting examples of lignocellulosic biomass material are agricultural residues (straw etc.), forestry residues (products from first clearing), forestry products, dedicated crops (short-rotation coppice), residues from the food and agriculture industry, household organic waste, waste from woodworking establishments, scrap timber from construction, and paper, recycled or not.

The lignocellulosic biomass can also be derived from by-products of the paper industry such as kraft lignin, or black liquor originating from the manufacture of paper pulp.

The algae that can be used in hydroliquefaction of algae are macroalgae and/or microalgae. Thus, the feed can be constituted by procaryotic organisms such as blue algae or cyanobacteria or eucaryotic organisms such as groups formed of single-cell species (Euglenophytes, Cryptophytes, Haptophytes, Glaucophytes, etc.), groups formed of single-cell or multi-cell species such as red algae or Rhodophyta, and Stramenopiles, including in particular Diatoms and brown algae or Phaeophyceae. Finally, the feed can also be constituted by macroalgae such as green algae (causing "green tides") sea cabbage or kelp (also called wrack). In general, algae can contain water, proteins, amino acids, saccharides, lipids, tannins, polyphenols, polyphloroglucinols, antioxidants, and inorganic compounds.

The ebullating bed technology also makes it possible to carry out the conversion of biomass in co-processing with other feeds that are difficult to convert in fixed-bed processes of hydrotreating/hydroconversion. These feeds can be of hydrocarbon (petroleum) nature, of non-petroleum nature or of renewable nature.

The hydrocarbon (petroleum) feeds in question are feeds such as petroleum residues, petroleum crudes, synthetic crudes, topped petroleum crudes, deasphalted oils, resins from deasphalting, asphalts from deasphalting, derivatives from petroleum processing (for example: LCO, HCO, FCC slurry; heavy GO/coking VGO, residue from visbreaking or similar thermal processes, etc.), bituminous sands or their derivatives, bituminous shales or their derivatives, or mixtures of said feeds.

The non-petroleum feeds in question are feeds such as coal or hydrocarbon waste and/or industrial polymers, for example polymers recycled from used tyres, used polymer residues for example from recycled motor vehicles, household organic or plastic waste, or mixtures of said feeds.

Feeds constituted by at least a proportion of the effluents from Fischer-Tropsch synthesis, carried out using synthesis gases produced by gasification of feeds of the petroleum, non-petroleum (coal, gas) or renewable (biomass) type, can also undergo a co-processing of conversion with lignocellulosic biomass in technology of the ebullating bed type. The tars and residues that can only be upgraded with difficulty, or not at all, resulting from said gasification can also be used as feed in co-processing.

The lignocellulosic biomass can also be processed with feeds obtained from other renewable sources, for example oils and fats of vegetable or animal origin, or mixtures of said feeds, containing triglycerides and/or free fatty acids and/or esters. The vegetable oils can advantageously be raw or refined, partly or completely, and are obtained from the following plants: colza, sunflower, soya, palm, cabbage palm, olive, coconut, jatropha, this list not being limitative. Oils from algae or fish are also relevant. The oils can also be produced from genetically modified organisms. Animal fats are advantageously selected from lard or fats composed of residues from the food industry or from the catering trader. All products or mixtures of products resulting from the thermochemical conversion of biomass, for example charcoal or pyrolysis oil, are also feeds that can be used.

Pretreatment

The present invention preferably comprises a pretreatment of biomass with a view to its subsequent treatment in hydroconversion reactors.

The pretreatment of lignocellulosic biomass and/or of one or more constituents of lignocellulosic biomass selected from the group comprising cellulose, hemicellulose and/or lignin advantageously comprises at least one of the following stages:

a) a drying stage and/or a roasting stage,
b) a grinding stage.

Preferably, the pretreatment comprises a stage of partial reduction of the water content (or drying) of the lignocellulosic biomass, followed by a stage of reduction of particle size to a size range suitable for preparing the biomass/solvent suspension for processing in the hydroconversion reactors.

In the case when wood is used as lignocellulosic raw material, the moisture content is approximately 50% at the time of felling the tree in the forest. Natural air drying of logs makes it possible to lower the water content to approximately 30-35%. Then the logs are ground coarsely to forestry chips in the form of particles a few centimetres in size (shredding).

The feed can advantageously be preprocessed in various ways.

The lignocellulosic biomass can be subjected to a drying stage followed by a grinding stage. The biomass can also be subjected to a drying stage, then to a stage of roasting, and then to a grinding stage. The stages of drying and of roasting can be carried out in a single stage in the same equipment, followed by a grinding stage. The grinding stage can also take place after drying and can optionally be supplemented with additional grinding after roasting. The pretreatment of the biomass can also be limited to the grinding stage.

Drying and roasting are different thermal treatments. The first essentially removes the water contained in the biomass whereas the second causes changes in the chemical structure of the constituents. Roasting can be defined as pyrolysis at moderate temperature and with controlled dwell time, as it is accompanied not only by drying, but also by partial destruction of the lignocellulosic material. The particles of biomass after roasting are more spherical in shape and less rough, thus creating fewer agglomerates during preparation of the suspension. Roasting thus permits more homogeneous fluidization in the ebullating bed.

The drying stage is carried out at a temperature below 250° C., preferably below 200° C., preferably for 15 to 120 minutes leading to a water content of the biomass to be treated of approximately 5 to 10%.

The roasting stage is carried out at a temperature comprised between 200° C. and 300° C., preferably between 225° C. and 275° C., in the absence of air, preferably for 15 to 120 minutes, leading to a water content of the biomass to be treated of approximately 3 to 5%.

In the case of a single drying/roasting stage in the same vessel, the water content of the biomass to be treated can also reach 3 to 5%. The known technologies for drying or roasting are for example the rotary kiln, moving bed, fluidized bed, heated screw, contact with heat-supplying metal balls. These technologies can optionally use a gas circulating in cocurrent or countercurrent such as nitrogen or any other gas that is inert under the reaction conditions.

The particles of biomass obtained from the stages of drying and/or roasting are then sent to a grinding mill for obtaining the desired granulometry for hydroliquefaction. Grinding prior to hydroliquefaction facilitates transport to the reaction zone and promotes gas/liquid/solid contact.

The grinding stage is greatly facilitated by the roasting stage, which makes it possible to reduce the energy consumption relative to grinding without preliminary roasting. Grinding gives particles of biomass smaller than 600 microns, preferably smaller than 150 microns.

The drying and/or roasting and/or grinding stages can be operated in decentralized mode alongside the production of biomass or in centralized mode supplying the liquefaction process directly.

The pretreatment of lignocellulosic biomass preferably comprises a roasting treatment. In the case of hydroliquefaction of lignin alone, the roasting stage is unnecessary.

After pretreatment, particles of lignocellulosic biomass or of one or more constituents of lignocellulosic biomass selected from the group comprising cellulose, hemicellulose and/or lignin having a water content of 1 to 50%, preferably 2 to 35% and, more preferably 3 to 10%, as well as a particle size less than 600 microns, preferably less than 150 micron are obtained.

Pretreatment of the algae advantageously comprises at east one of the following stages:

a) a demineralization stage,
b) a drying stage.
c) a grinding stage.

Preferably, the algae are firstly subjected to a demineralization stage known to a person skilled in the art, in order to reduce the inorganic salts and noxious metals with hydroconversion catalysts. According to the feed and the operating conditions, the demineralization also allows upgrading of the alginates, products used as thickeners, gelling agents and emulsifiers. This demineralization stage consists of passing the algae through several solutions or baths, optionally having different pH levels. Between each bath, there is generally a more or less coarse liquid/solid separation (decantation, filtration or centrifugation), that allows the algae in the aqueous medium to be recovered.

Firstly, the algae are washed in fresh water in order to remove chlorides and other soluble species, and optionally dilacerated. They are then optionally macerated for a few hours in a dilute mineral acid, preferably sulphuric acid, then, optionally, washed in fresh water, optionally neutralized with a base, preferably sodium carbonate, and optionally dilacerated. Optionally, the algae are macerated and dilacerated in a concentrated basic solution, preferably a sodium carbonate solution, in order to form sodium alginates that are soluble in the aqueous phase. This aqueous phase is then separated from the solid phase, then acidified with a mineral acid, preferably sulphuric acid, in order to precipitate the alginic acid, which can easily be recovered by filtration or centrifugation for example.

The solid phase, containing the thus-pretreated algae, is then optionally subjected to other pretreatment stages, while the aqueous phases originating from the different stages are optionally subjected to additional treatments before their discharge to the natural environment or optional recycling into the process.

The pretreatment then preferably comprises a stage of partially reducing the water content (or drying) of the algae or a stage of reducing the particles in size until reaching the appropriate size range for constituting the algae/solvent suspension for the treatment in the hydroconversion reactor(s). This pretreatment can advantageously be carried out in different ways:

After an optional demineralization stage, the algae can be subjected to a drying stage, followed by a grinding stage. The algae, in particular the macroalgae, can be subjected to a grinding stage, followed by a drying stage. The pretreatment of the algae can also be limited to the grinding stage.

Essentially, the drying removes the water contained in the algae. The known technologies for the drying are, for example, the rotary kiln, moving bed, fluidized bed, heated screw, contact with heat-supplying metal balls. These technologies can optionally use a gas circulating in cocurrent or countercurrent such as nitrogen or any other gas that is inert under the reaction conditions. Other drying techniques are for example, flocculation assisted by a chemical or physical additive or by an electromagnetic field, decantation, centrifugation, or gentle drying under conditions close to the vaporisation point of water.

The drying stage is carried out at a temperature below 250° C., preferably below 200° C., preferably for 15 to 120 minutes, leading to a water content of the biomass to be treated of approximately 5 to 10%.

The particles of algae obtained from the stages of drying are then sent to a grinding mill for obtaining the desired granulometry for hydroliquefaction. Grinding prior to hydroliquefaction facilitates transport to the reaction zone and promotes gas/liquid/solid contact.

Grinding gives particles of biomass smaller than 600 microns, preferably smaller than 150 microns.

The drying and/or grinding stages can, be operated in decentralized mode alongside the production of biomass or in centralized mode supplying the liquefaction process directly.

After pretreatment, particles of algae having a water content of 1 to 50%, preferably 2 to 35% and more preferably 3 to 10%, as well as a particle size less than 600 microns, preferably less than 150 micron are obtained.

Hydroliquefaction (Hydroconversion): First Stage

In the present invention, the liquefaction of biomass is carried out by a catalytic process of hydroconversion in at least two stages using reactors of the ebullating bed type connected in series directly.

The biomass, optionally after the stage of pretreatment described above, is mixed with a solvent, preferably a hydrogen donor solvent comprising for example tetralin and/or naptheno-aromatic molecules. Advantageously, the solvent comprises vacuum distillate, preferably vacuum gas oil (VGO), and can also contain atmospheric distillate such as diesel. The solvent is preferably a solvent obtained from a separation stage carried out after the two hydroconversion stages of the process, said solvent being recycled upstream of the two hydroconversion stages. In the case of co-processing with, other feeds, the solvent can also be constituted partially or totally by a liquid co-feed.

The biomass/solvent mixture is a suspension of particles of biomass dispersed in said solvent; said suspension of fine solid particles in a liquid is also called a "slurry". For simplicity the term suspension will be used hereinafter. For preparing the suspension, the biomass particle size is less than 5 mm, preferably less than 1 mm, preferably less than 650 microns and more preferably less than 150 microns. The solvent/biomass weight ratio is generally from 0.1 to 3, preferably from 0.5 to 2.

The hydrogen donor solvent has a triple role. Firstly, it ensures formation of an injectable or pumpable suspension (slurry) for feeding into the first reaction zone of hydroconversion. Secondly, a partial effect of, solvolysis of the biomass is observed, facilitating the subsequent hydroconversion reactions. Thirdly, a hydrogen donor solvent effect is observed, i.e. transfer of hydrogen from the solvent to the feed. This transfer of hydrogen therefore represents an additional source of hydrogen for the indispensable need for hydrogen in the transformation of biomass into biofuels.

Advantageously, the fraction of conversion products having a distillation range comprised between atmospheric gas oil and vacuum gas oil is recycled wholly or partly to the stage of suspension preparation. Recycling some or all of the VGO resulting from hydroconversion as solvent makes it possible to increase the yield of desired fuel bases (diesel, kerosene, naphtha etc.). Apart from its role as solvent, the recycled portion of the VGO cut also represents raw material for the hydrocracking reactions in the two hydroconversion reactors.

The suspension is then introduced at the bottom of the first hydroconversion reactor containing an ebullating bed operating with ascending flow of liquid and gas and containing at least one hydroconversion catalyst. The hydrogen necessary for operation can be supplied by make-up hydrogen and/or by hydrogen recycled from the process and/or from another nearby refining process.

The manner of operation of the ebullating bed catalytic reactor, including recycling of the liquids from the reactor upwards through the agitated catalyst bed, is generally well known. Ebullating bed technologies use supported catalysts, generally in the form of extrudates the diameter of which is generally of the order of 1 mm or less than 1 mm. The catalysts remain inside the reactors and are not discharged with the products. The catalytic activity can be kept constant by in-line replacement of catalyst. Therefore it is not necessary to stop the unit in order to replace spent catalyst, nor to increase the reaction temperatures in the course of the cycle in order to compensate for deactivation. Moreover, by working under constant operating conditions it is possible to obtain yields and product qualities that remain constant throughout the cycle. Also, because the catalyst is constantly agitated by considerable recycling of liquid, the pressure loss in the reactor remains low and constant, and the exothermic effects of the reaction are quickly averaged over the catalyst bed, which is therefore almost isothermal and does not require injection of quenches.

Operation is usually at a pressure of 15 to 25 MPa, preferably 16 to 20 MPa, at a temperature of approximately 300° C. to 440° C., preferably between 325° C. and 375° C. for the first reactor and between 350° C. and 470° C., preferably between 350 and 425° C., for the second reactor, and at an hourly mass velocity comprised between 0.1 and 5 h$^{-1}$. The quantity of hydrogen mixed with the feed is usually approximately 0.1 to 2 normal cubic metres (Nm$^3$) per kg of feed and most often from approximately 0.1 to approximately 0.5 Nm$^3$/kg. After the first stage, the conversion of the feed is comprised between 30 and 100%, preferably between 50 and 99%. After the first stage, the deoxygenation of the feed is comprised between 30 and 100%, preferably between 50 and 99%.

The suspension is fed into the first reactor, which is maintained under selected temperature and pressure conditions and in the presence of particles of a hydroconversion catalyst. The temperature of the reactor in this first hydroconversion stage is lower than the temperature of the second hydroconversion stage. Selection of the operating conditions, and in particular selection of a temperature between 300° C. and 440° C., preferably between 325 and 375° C., permits hydrogenation and liquefaction of the biomass at a level of conversion that is already very high, and at the same time permits hydrogenation of the solvent. The moderate temperature level limits thermal cracking leading to the formation of undesirable gases and limits condensation of the aromatic rings leading to the formation of undesirable coke. This minimizes the deactivation of the catalyst and greatly extends the working life of the catalyst.

The type of catalyst used in the first ebullating bed reactor is described below.

Hydroliquefaction (Hydroconversion): Second Stage

At least a proportion of the effluent originating from the first hydroconversion stage is then injected into a second hydroconversion reactor containing an ebullating bed catalyst and operating with ascending flow of liquid and gas and containing at least one hydroconversion catalyst. The effluent is mixed with additional hydrogen, which can be make-up hydrogen and/or hydrogen recycled from the liquefaction process and/or from another nearby refining process. This reactor, which operates similarly to the reactor in stage (1), is used at a temperature at least approximately 10° C. higher than that of the reactor in stage (1). The temperature increase in the second reactor can be achieved by supplying hot hydrogen (fresh or recycled). Generally, operation is at a temperature of approximately 350° C. to 470° C. and preferably 350° C. to 425° C. The pressure of the reactor in stage (2) is from 0.1 to 1 MPa lower than for the reactor in stage (1), to permit flow of at least a proportion of the effluent from stage (1) without pumping being necessary. The catalyst used in stage (2) can be identical to that in stage (1).

Operation is usually at a pressure of 15 to 25 MPa, preferably 16 to 20 MPa, at a temperature of approximately 350° C. to 470° C., preferably 350° C. to 425° C. and at an hourly mass velocity comprised between 0.1 and 5 h$^{-1}$. The quantity of hydrogen mixed with the feed is usually from approximately 0.1 to approximately 2 normal cubic metres (Nm$^3$) per kg of feed and most often from approximately 0.1 to approximately 0.5 Nm$^3$/kg.

In the reactor in stage (2), the higher temperature than in the first stage is selected to provide more complete catalytic and thermal conversion of the biomass that has not yet been converted. The hydroconversion of liquid products originating from the first stage and thermal conversion of the biomass to liquids are accentuated, as well as the hydrodeoxygenation, decarboxylation, decarbonylation, hydrodesulphurization and hydrodenitrogenation reactions. The operating conditions are selected to minimize the formation of gases or formation of solids (generally called coke).

In the process according to the invention, the operating conditions, for a given catalyst and feed, are adjusted depending on the total conversion desired.

Optionally, the effluent obtained at the end of the first hydroconversion stage is subjected to separation of the light fraction and at least a proportion, preferably all, of the residual effluent is treated in the second hydroconversion stage. This separation is advantageously carried out in an inter-stage separator. The light fraction contains very predominantly compounds boiling at the most at 300° C., or even at the most at 450° C. This separation avoids overcracking of the light fraction in stage (2). It also makes it possible to reduce capital expenditure for the reactor in stage (2) (less feed to be treated, less catalyst etc.) or to supply an external feed to the reactor in stage (2) or to increase the residence time in the reactor in stage (2). The hydrogen thus separated from the light fraction can be recycled to the process after purification. So as to improve the separation of the light fraction, the bottom product of the inter-stage separator containing predominantly the heavy fraction and optionally a proportion of the light fraction, can be treated in a stage of vacuum distillation or liquid/liquid extraction or high-pressure stripping with hydrogen, for example.

Although the process for hydroliquefaction in two hydroconversion stages according to the invention produces high yields of fuel bases, a third ebullating bed hydroconversion reactor operating at a higher temperature than the second reactor can be envisaged for certain feeds of biomass or of biomass/co-feed mixture. In this case, the temperature of the third reactor is at least 10° C. higher than that of the second reactor. The possibility of inter-stage separation of gaseous effluents applies similarly upstream of this third reactor.

Catalysts

In the two stages of hydroliquefaction, it is possible to use any conventional catalyst for hydrotreating and/or hydroconversion of feeds of high molecular weight, in particular a granular catalyst comprising, on an amorphous support, at least one metal or metal compound having a hydrodehydrogenating function.

This catalyst is advantageously a catalyst comprising at least one group VIII metal, selected from the group comprising Ni, Pd, Pt, Co, Rh and/or Ru, preferably nickel and/or cobalt, most often in combination with at least one group VIB metal, preferably molybdenum and/or tungsten. For example, a catalyst will be used comprising from 0.5 to 10 wt. % of nickel and preferably from 1 to 5 wt. % of nickel (expressed as nickel oxide NiO) and from 1 to 30 wt. % of molybdenum, preferably from 5 to 20 wt. % of molybdenum (expressed as molybdenum oxide MoO$_3$) on an amorphous mineral support. This support will be selected for example from the group comprising alumina, silica, silica-aluminas, magnesia, clays and mixtures of at least two of these minerals. Advantageously, said support contains other doping compounds, in particular oxides selected from the group comprising boron oxide, zirconia, ceria, titanium dioxide, phosphoric anhydride and a mixture of these oxides. An alumina support is used most often, and very often an alumina support doped with phosphorus and optionally with boron. The concentration of phosphoric anhydride P$_2$O$_5$ is usually comprised between 0 or 0.1% and approximately 10 wt. %. The concentration of boron trioxide B$_2$O$_3$ is usually comprised between 0 or 0.1% and approximately 10 wt. %. The alumina used is usually a γ or η alumina. This catalyst is most often, in the form of extrudates. The total content of oxides of metals of groups VI and VIII is often from approximately 5 to approximately 40 wt. % and in general from approximately 7 to 30 wt. % and the weight ratio, expressed as metal oxide, of metal (or metals) of group VI to metal (or metals) of group VIII is in general from approximately 20 to approximately 1 and most often from approximately 10 to approximately 2.

The catalysts of the stages of hydroconversion of the present invention can be identical or different in the reactors. Preferably the catalysts used are based on cobalt-molybdenum or nickel-molybdenum on alumina.

Prior to injection of the feed, the catalysts used in the process according to the present invention are preferably subjected to a treatment of sulphidation for transforming, at least partly, the metallic species to sulphide before bringing them into contact with the feed to be treated. This treatment of activation by sulphidation is well known to a person skilled in the art and can be carried out by any method already described in the literature either in situ, i.e. in the reactor, or ex situ.

In the case of feeds containing little or no sulphur such as feeds of renewable origin or, in the case of co-processing, with products obtained from Fischer-Tropsch synthesis or any other feed containing little sulphur (<0.5% w/w), an organic sulphur compound (such as dimethyldisulphide DMDS or any other organic polysulphide) or a mineral sulphur compound can advantageously be injected continuously or periodically at the inlet of the first and/or of the second hydroconversion stage and/or of the third hydroconversion stage so as to keep the metals of the catalyst or catalysts in the form of sulphides.

Each of the ebullating bed reactors comprises at least one means for withdrawing catalyst out of said reactor positioned near the bottom of the reactor and at least one means for make-up of fresh catalyst in said reactor positioned near the top of said reactor. Make-up of fresh catalyst and withdrawal of catalyst can optionally be carried out through the same pipework when these two operations are not simultaneous.

The spent catalyst is partly replaced with fresh catalyst (new or regenerated) by withdrawal at the bottom of the reactor and introduction of fresh catalyst at the top of the reactor at regular intervals, i.e. for example in bursts or quasi-continuously. For example, fresh catalyst can be introduced every day. The rate of replacement of spent catalyst with fresh catalyst can be for example from approximately 0.05 kg to approximately 10 kg per tonne of feed. Said withdrawal and said replacement are carried out by means of devices that permit continuous operation of hydroconversion stage. The unit usually has one circulating pump per reactor for maintaining the ebullating bed catalyst by continuous recycling of at least a proportion of the liquid withdrawn at the top of the reactor and reinjected at the bottom of the reactor. It is also possible to send the spent catalyst withdrawn from the reactor to a regeneration zone, in which the carbon and sulphur that it contains are removed, and then return this regenerated catalyst to the first or to the second or to the third hydroconversion stage, optionally supplemented with fresh catalyst. It is also possible to send the spent catalyst withdrawn from the reactor to a rejuvenation zone, in which at least a proportion of the deposited metals is removed, before regenerating the catalyst by removing the carbon and sulphur that it contains, and then return this rejuvenated and regenerated catalyst to the first or to the second or to the third hydroconversion stage, optionally supplemented with fresh catalyst. The stage of regeneration or of rejuvenation can optionally be preceded by a stage of stripping for removing at least a proportion of the hydrocarbons withdrawn with the catalyst. The stage of regeneration can optionally be followed by sulphidation before returning to the first, to the second or to the third hydroconversion stage.

It is also possible to transfer wholly or, partly the spent catalyst withdrawn from the reactor in stage (1), operating at lower temperature, directly to the reactor in stage (2), operating at higher temperature or transfer wholly or partly the spent catalyst withdrawn from the reactor in stage (2) directly to the reactor in stage (1). It was found that in the absence of co-processing the catalyst is deactivated less in the reactor operating at lower temperature than in the reactor operating at higher temperature, apparently because of the lower operating temperatures. However, in the case of a particular co-processing, in which the feed or feeds added in stage (1) as well as the feed of the biomass type introduced in stage (1), can cause faster deactivation of the catalyst in stage (1) operating at lower temperature, transfer of some or all of the spent catalyst withdrawn from the reactor in stage (2), operating at higher temperature, can be carried out directly to the reactor in stage (1). This catalyst cascade system gives longer catalyst life. This principle can be extrapolated to the case of three reactors used in series. Use of this catalyst cascade principle provides improved hydrogenation and liquefaction of the biomass per tonne of fresh catalyst used or a decrease in the quantity of fresh catalyst required for each tonne of biomass liquefied. In the case of cascading, the catalyst of the first and of the second reactor, or even of the third reactor, is identical. The stages of stripping and/or rejuvenation and/or regeneration and/or sulphidation of the withdrawn catalyst can optionally be integrated with the application of catalyst cascading between two hydroconversion reactors.

Separation

For the purpose of producing fuel bases (naphtha, kerosene and/or diesel), the effluent obtained at the end of the second hydroconversion stage preferably undergoes a separation stage, for separating a gaseous phase, an aqueous phase, at least one light fraction of liquid hydrocarbons of the naphtha, kerosene and/or diesel type, a vacuum gas oil fraction, a vacuum residue fraction and a solid fraction, which can be in the vacuum residue.

The effluent from the second hydroconversion stage is advantageously treated according to the following optional stages:

The effluent obtained from the process according to the invention undergoes at least one separation stage and preferably a stage of gas/liquid separation and of separation of the aqueous phase and of at least one liquid hydrocarbon base, said stages being optional, and applicable in any order relative to one another. The separation stage can advantageously be implemented by any method known to a person skilled in the art, for example by combining one or more high and/or low pressure separators, and/or stages of high and/or low pressure distillation and/or stripping, and/or stages of liquid/liquid extraction, and/or stages of solid/liquid separation and/or stages of centrifugation.

Preferably, separation is carried out in a fractionation section, which can firstly comprise a high-pressure high-temperature (HPHT) separator, and optionally a high-pressure low-temperature (HPLT) separator, and/or atmospheric distillation and/or vacuum distillation.

Advantageously, the effluent originating from stage (2) according to the invention first undergoes a stage of gas/liquid separation. Preferably, the effluent from the second reactor is separated in a high-pressure high-temperature (HPHT) separator, from which a vapour phase and a liquid phase are recovered. The vapour phase can be sent to a high-pressure low-temperature (HPLT) separator via a heat exchanger, from which a vapour phase containing gases ($H_2$, $H_2S$, $NH_3$, $H_2O$, $CO_2$, CO, C1-C4 hydrocarbons, etc.), an aqueous phase and a liquid phase are recovered. The high-pressure low-temperature (HPLT) separator can also treat the vapour phase obtained from the inter-stage separator (ISS), via a heat exchanger, which can be common with that treating the vapour phase originating from the HPHT separator.

The aqueous phase and/or liquid phase from the high-pressure low-temperature (HPLT) separator are advantageously expanded in one or two low-pressure low-temperature (LPLT) separators so as to be at least partially degassed. A stage of intermediate expansion in a medium-pressure low-temperature (MPLT) separator can also be envisaged.

Alternatively, the fraction(s) obtained from the HPHT and/or HPLT and/or MPLT and/or LPLT separator(s) can be sent directly, or by increasing the pressure of these streams, separately or mixed, to stages of further refining such as hydrotreating or hydrocracking. In the case where the effluents from the hydroliquefaction section are treated in an HPHT separator and when the vapour phase from the HPHT separator is treated directly in stages of additional refining such as hydrotreating or hydrocracking, this configuration can be described as an integrated scheme, which offers technico-economic advantages, since the streams at high pressure will not require an increase in pressure for their additional refining.

Alternatively, the fraction(s) obtained from the HPHT and/or HPLT and/or MPLT and/or LPLT separator(s) can be treated in stages of liquid/solid and/or liquid/liquid extraction and/or precipitation and/or liquid/solid separation.

The solids extracted at the bottom of vacuum distillation and/or recovered during solid/liquid and/or liquid/liquid extraction and/or precipitation and/or liquid/solid separation and/or centrifugation can be constituted by unconverted feed(s), of solids produced by undesirable reactions such as coke, inorganic solids present as impurities or resulting from fines produced by attrition of the catalyst. These solids can be reprocessed, stored in the dump or upgraded by undergoing various chemical and/or thermal treatments such as gasification for production of hydrogen or incineration. They can also serve as solid fuels, for example in cement kilns or for supply of energy on site.

The gases extracted from the HPLT separator undergo a purification treatment to recover the hydrogen and recycle it to the hydroconversion reactors. The same applies to the gaseous effluents originating from the optional units for further processing, for example hydrotreating and/or hydrocracking of hydrocarbon cuts. The gaseous phase received from the inter-stage separator can also be added. This arrangement is not obligatory and the separator might not be present.

The aqueous phase is composed essentially of the water that was present initially (incomplete drying) or was produced during hydrodeoxygenation reactions taking place during hydroliquefaction or that was deliberately introduced into the process in order to dissolve the ammonium sulphide salts formed in the exchangers, and oxygen-containing compounds, in particular phenols. The oxygen-containing compounds of the aqueous phase can be upgraded. Generally, removal of the aqueous phase and removal or recovery of the oxygen-containing compounds can be carried out by all the methods and techniques known to a person skilled in the art, for example by drying, passing over a drying agent or a molecular sieve, flash, solvent extraction, distillation, decanting and membrane filtration or by combining at least two of these methods. The aqueous phase will generally be sent to a station for treatment of wastewater comprising physico-chemical and/or biological (activated sludge) stages and/or stages of filtration and/or incineration.

The liquid phases obtained from the HPHT, HPLT and optionally MPLT and LPLT separators, are advantageously sent to a fractionation system. The fractionation system comprises an atmospheric distillation system and/or a vacuum distillation system for producing a gaseous effluent, the so-called light fractions originating from atmospheric distillation, in particular containing naphtha, kerosene and diesel, a so-called heavy fraction originating from vacuum distillation containing vacuum gas oil (VGO) and a vacuum residue fraction (VR). The products obtained can be integrated in the fuel, pools or can undergo additional refining stages including hydrotreating and/or hydrocracking under high hydrogen pressure. The naphtha, kerosene, gas oil and VGO fraction(s) can be subjected to one or more treatments (hydrotreating, hydrocracking, alkylation, isomerization, catalytic reforming, catalytic or thermal cracking or others) to bring them to the required specifications (sulphur content, smoke point, octane number, cetane number, etc.) separately or mixed.

Some or all of the vacuum gas oil (VGO) heavy hydrocarbon fraction can be recycled upstream of liquefaction to form the suspension with the biomass. Recycling of this phase gives an increase in net conversion of the biomass to fuel bases. Recycling of this phase, which acts as hydrogen donor solvent, also provides some of the hydrogen necessary for hydroliquefaction. This recycle solvent can also contain a cut obtained by atmospheric distillation, such as diesel for example. This recycle solvent can also be obtained from a stage of solid/liquid or liquid/liquid extraction and thus be constituted at least partially by compounds having boiling points similar to the compounds of the atmospheric distillates or vacuum distillates. The cut rich in VGO can also serve as a base for heavy fuel oils or bunker fuel or can be sent to refinery units, such as units for hydrocracking or for catalytic cracking. The cut rich in VGO can also be gasified in order to produce hydrogen.

For the residue from vacuum distillation (VR), the cut point is generally selected so that the initial boiling point of the heavy fraction is from approximately 450° C. to approximately 550° C. This heavy fraction is a solid, which can be burnt subsequently or can be used as feed for a gasification unit for producing hydrogen and energy. The hydrogen thus produced can be supplied to the hydroliquefaction process.

The separation stage is an optional stage. The effluent originating from the hydroconversion stage (2) need not undergo such a stage for producing a synthetic crude (SCO) which will be processed, after an optional hydrotreating stage to stabilize it and for removal of lighter compounds (C3-), in an existing refinery. The separation stage can be simplified as in the case of the integrated scheme mentioned above (without intermediate decompression).

Upgrading of the various cuts of fuel bases is not the object of the present invention and these methods are well known to a person skilled in the art. The light fraction(s) and/or the heavy fraction obtained after separation can undergo a hydrotreating and/or hydrocracking stage. Generally, naphtha can undergo hydrotreating in a dedicated unit, or can be sent to a hydrocracking unit where its characteristics are transformed to those of a feed that is acceptable for catalytic reforming and/or isomerization. The kerosene and gas oil produced can undergo hydrotreating optionally followed by hydrocracking so that they meet the specifications (sulphur content, smoke point, cetane number, aromatics content, etc.).

Generally, hydrotreating and/or hydrocracking after hydroliquefaction can be carried out either conventionally in a section for conventional intermediate separation as described above, or by directly integrating the section for hydrotreating/hydrocracking with the hydroliquefaction section with or without prior separation of effluents and without intermediate decompression between the two stages. At least a proportion of the effluent obtained at the end of the second hydroconversion stage can directly undergo a hydrotreating and/or hydrocracking stage without intermediate decompression.

Thus, in the process according to the invention, the degrees of conversion in hydroliquefaction of the starting biomass obtained for the two stages of hydroconversion are of the order of 80 to 99.5%. The yield of upgradeable gases and liquids, the fraction C3 −450° C., is greater than 30%. The liquefied products obtained are of good quality with an oxygen content generally between 0.1 and 5% depending on treatment severity. Thus, the process for direct hydroliquefaction of biomass according to the invention makes it possible to produce, in two stages of ebullating bed hydroconversion and with a choice of operating conditions, fuel bases with a favourable yield while offering the advantage of a degree of deoxygenation greater than 85%, preferably 95%.

BRIEF DESCRIPTION OF THE FIGURE

The FIGURE shows a preferred embodiment of the process according to the invention. The installation and process according to the invention are described in essence. The operating conditions described previously will not be repeated.

The biomass (10), preferably after previous drying and/or coarse grinding and/or roasting and/or demineralization, is ground in the grinding mill (12) in order to produce particles of suitable size for forming a suspension and so that they are more reactive under conditions of hydroliquefaction. The biomass is then brought into contact with the recycle solvent (15) obtained from the process in vessel (14) to form the suspension. A sulphur-containing compound for maintaining catalytic activity can be injected (not shown) into the line leaving the vessel (14). The suspension is pressurized by the pump (16), mixed with the recycled hydrogen (17), preheated in vessel (18) and introduced by the pipe (19) at the bottom of the first ebullating bed reactor (20) operating with ascending flow of liquid and gas by the distributor (21) and containing at least one hydroconversion catalyst (22). The hydrogen can also be heated in a furnace (not shown) that is independent of furnace (18). Supply of hydrogen is supplemented with make-up hydrogen (17a). The upper level of the ebullating bed is monitored by a level sensor using, for example, a radioactive source (22a). Make-up of fresh catalyst is carried out via line (23). The spent catalyst can be withdrawn via line (24) to be either discarded, or regenerated to remove carbon and sulphur and/or rejuvenated to remove metals before it is reinjected via line (23). The partially spent catalyst withdrawn via line (24) can also be transferred directly by line (25) into the second hydroconversion reactor (30) (cascading). This concept can also be used in the case of three reactors in series.

Optionally, the converted effluent (26) from reactor (20) can be subjected to separation of the light fraction (71) in an inter-stage separator (70).

Some or all of the effluent (26) originating from the first hydroconversion reactor (20) is advantageously mixed with additional hydrogen (28), if necessary with preheating in (27). This mixture is then injected by pipe (29) into a second ebullating bed hydroconversion reactor (30) operating with ascending flow of liquid and gas by distributor (31) and containing at least one hydroconversion catalyst (32). The operating conditions, in particular temperature, in this reactor are selected to reach the required level of conversion, as described previously. Optional make-up of fresh catalyst in this second reactor is carried out via line (33). The catalyst can be supplied periodically or continuously. The spent catalyst can be withdrawn via line (34) either to be discarded, or to be regenerated to remove carbon and sulphur and/or rejuvenated to remove metals before it is reinjected. The upper level of the ebullating bed is monitored by a level sensor, for example using a radioactive source (32a).

The effluent treated in reactor (30) is sent by line (38) to a high-pressure high-temperature (HPHT) separator (40) from which a vapour phase (41) and a liquid phase (44) are recovered. The vapour phase (41) is sent, optionally mixed with vapour phase (71) originating from the optional inter-stage separator (70) between the two reactors, generally via an exchanger (not shown) or an air cooler for cooling (not shown) to a high-pressure low-temperature (HPLT) separator (72) from which a vapour phase (73) containing gases ($H_2$, $H_2S$, $NH_3$, $H_2O$, $CO_2$, CO, C1-C4 hydrocarbons, etc.), an aqueous phase (75) containing predominantly water and oxygen-containing compounds, in particular phenols, and a liquid phase (74), are recovered.

The vapour phase (73) from the high-pressure low-temperature (HPLT) separator (72) is treated in the hydrogen purification unit (42), from which hydrogen (43) is recovered and is recycled via compressor (45) to the reactors (20) and/or (30). The gases containing undesirable nitrogen-containing, sulphur-containing and oxygen-containing compounds are discharged from the installation (stream (46)).

The liquid phase (74) from the high-pressure low-temperature (HPLT) separator (72) is expanded in device (76) and then sent to the fractionation system (50). Optionally, a medium-pressure separator (not shown) after the expansion valve (76) can be installed for recovering a vapour phase, which is sent to the purification unit (42) and a liquid phase which is sent to the fractionation section (50).

The liquid phase (44) from high-pressure high-temperature (HPHT) separation (40) is expanded in device (47) and then sent to the fractionation system (50). The same applies to the liquid phase (74) originating from the high-pressure low-temperature (HPLT) separator (72), which is expanded in device (76). Of course, fractions (74) and (44) can be sent together, after expansion, to system (50). The fractionation system (50) comprises an atmospheric distillation system for producing a gaseous effluent (51), a so-called light fraction (52) containing in particular naphtha, kerosene and diesel and a so-called heavy fraction (55). This heavy fraction (55) is sent to a vacuum distillation column (56) for recovering a solid phase (57) containing the vacuum residue and, unconverted biomass and a liquid phase (58) containing vacuum gas oil. This solid fraction (57) can be burned subsequently or can serve as feed for a gasification unit for producing hydrogen and energy. The hydrogen thus produced can be fed into the hydroliquefaction process. The liquid phase (58) serves at least partially as solvent for the liquefaction process and is recycled after pressurization (59) via pipe (15) to vessel (14) to be mixed with the biomass. The portion of the liquid phase (58) not used as solvent is discharged via line (60).

EXAMPLES

The following examples were carried out in two autoclaves to represent the process with two ebullating bed reactors. The use of tetralin as donor solvent is well known and can be likened to the recycling of at least a proportion of a cut obtained from fractionation of the effluent from the reaction section.

Example 1

Hydroliquefaction of Lignocellulosic Biomass

A 500-ml stainless steel autoclave was charged with 72.3 g of biomass together with 144.8 g of tetralin and 191 g of presulphided NiMo/$Al_2O_3$ catalyst.

For this test, the biomass was from beech, previously roasted at 250° C. for 1 hour, ground and sieved so as to obtain particles smaller than 100 microns (cf. simplified composition in Table 1). The inorganic matter essentially comprises ash and metals, traces of chlorine and of sulphur.

TABLE 1

Simplified composition of the feed of roasted beech

| | | |
|---|---|---|
| water | % w/w | 1.7 |
| Organic C | % w/w | 53.3 |
| Organic H | % w/w | 5.6 |
| Organic O | % w/w | 38.4 |
| inorganic matter | % w/w | 0.9 |

The autoclave was closed and made inert with several sequences of pressurization/depressurization with nitrogen. Hydrogen was then introduced at an initial pressure of approximately 7.5 MPa, then the autoclave was heated to 350° C. and this temperature was maintained during a first stage of 4 h. The pressure at this temperature reached 16 MPa and it was maintained by adding $H_2$ to make up for the consumption of $H_2$ during the first stage. At the end of the first stage, the autoclave was cooled and then depressurized. For the second hydroconversion stage, hydrogen was again introduced at an initial pressure of 7 MPa, then the autoclave was heated to 400° C. and this temperature was maintained during a second stage of 4 h. The pressure at this temperature reached 16 MPa and it was maintained by adding $H_2$ to compensate for the consumption of $H_2$ during the second stage.

At the end of the test, the autoclave was cooled and then depressurized. The mixture obtained was filtered to separate the liquid and the solids. The solid fraction was washed with ether and dried. The mass of solids obtained from the biomass is the difference between the quantity of solids recovered (after washing and drying) and the mass of catalyst introduced. The mass of solids obtained from the biomass makes it possible to calculate the conversion of the biomass introduced according to formula 1.

An additional experiment using The same feed quantities was also carried out under the conditions of the first stage, stopping at the first stage so as to recover and analyse the liquid fraction, and determine the conversion at the end of this first stage.

Formula 1: Conversion of Biomass

Conversion=100−(100×mass of solids obtained from the biomass/mass of biomass introduced)

Numerical application of formula 1 is presented in Table 2.

TABLE 2

Calculation of conversion

| | | stage | |
|---|---|---|---|
| | | 1 | 2 |
| initial feed of biomass | g | 72.3 | |
| solids from the biomass | g | 1.0 | 0.5 |
| conversion | % w/w | 98.6 | 99.3 |

Elemental analysis was carried out on the liquid obtained (cf. Table 3).

TABLE 3

Elemental analysis of the liquid fraction obtained

| | | stage | |
|---|---|---|---|
| | | 1 | 2 |
| Organic C | % w/w | 90.1 | 90.1 |
| Organic H | % w/w | 9.5 | 9.7 |
| Organic O | % w/w | 0.5 | 0.1 |

Note: the small difference in hydrogen content between stage 1 and stage 2 arises from the fact that the liquid fraction is heavily diluted in tetralin after reaction. The same applies, to a lesser degree, to the oxygen content.

On the basis of the oxygen content measured in the liquid fraction and the mass of liquid obtained, it is possible to calculate the quantity of oxygen in the liquid. The quantity of organic oxygen is calculated from the oxygen content of the biomass feed (cf. Table 1) and the mass of the biomass feed. The tetralin solvent is oxygen-free. It is therefore possible to calculate the degree of deoxygenation from formula 2.

Formula 2: Degree of Deoxygenation of Biomass

Degree of deoxygenation=100−(100×mass of oxygen in liquid fraction/mass of oxygen in the biomass introduced)

Numerical application of formula 2 is presented in Table 4.

TABLE 4

Calculation of deoxygenation

| | | stage | |
|---|---|---|---|
| | | 1 | 2 |
| Feed of biomass | g | 72.3 | |
| Organic O in feed | % w/w | 38.4 | |
| Organic O in feed | g | 27.8 | |
| Liquid fraction | g | 159.9 | 158.5 |
| Organic O in liquid fraction | % w/w | 0.5 | 0.1 |
| Organic O in liquid fraction | g | 0.8 | 0.2 |
| degree of deoxygenation of biomass | % w/w | 97.1 | 99.4 |

The liquid fraction was distilled so as to remove the tetralin and decalin (formed by partial hydrogenation of tetralin). Liquids having boiling points strictly below and strictly above those of tetralin and decalin were grouped together.

The mass of liquid obtained makes it possible to calculate a yield of liquids obtained from the biomass relative to the mass of biomass introduced. The yield of gases obtained from the biomass can be estimated from the difference between the conversion and the yield of liquids (cf. Table 5)

TABLE 5

Calculation of the yields of liquids and gases obtained from the biomass

|  |  | stage | |
|---|---|---|---|
|  |  | 1 | 2 |
| Initial feed of biomass | g | 72.3 | |
| Liquids obtained from the biomass | g | 23.1 | 21.7 |
| Yield of liquids from the biomass | % w/w | 32 | 30 |
| Conversion | % w/w | 98.6 | 99.3 |
| Yield of gases from the biomass | % w/w | 66.6 | 69.3 |

Spot analyses showed that these gases obtained from the biomass were essentially light hydrocarbons with 1 to 6 carbon atoms, water, carbon monoxide and carbon dioxide, hydrogen sulphide and ammonia.

The liquid obtained after removal of the solvent was subjected to elemental analysis to determine the contents of C, H and O (cf. Table 6), as well as gas chromatography to give simulated distillation. The use of simulated distillation makes it possible to determine the selectivities of various cuts present in the liquid obtained from the biomass after removal of the solvent (cf. Table 7) recycling of the VGO (fraction included in 343° C.+) will provide a further increase in yield of upgradeable products, in particular liquids.

TABLE 6

Elemental analysis of the liquid obtained from the biomass after removal of the solvent

|  |  | stage | |
|---|---|---|---|
|  |  | 1 | 2 |
| Organic C | % w/w | 87.7 | 88.1 |
| Organic H | % w/w | 9.1 | 11.0 |
| Organic O | % w/w | 3.2 | 0.9 |

TABLE 7

Selectivities of liquid cuts obtained from the biomass

|  |  | stage | |
|---|---|---|---|
|  |  | 1 | 2 |
| IP-177° C. | % w/w | 28 | 38 |
| 177-232° C. | % w/w | 10 | 14 |
| 232° C.-343° C. | % w/w | 22 | 28 |
| 343° C.+ | % w/w | 40 | 20 |

Example 2

Hydroliquefaction of Algae

A 500-ml stainless steel autoclave was charged with 72 g of green algae together with 144 g of tetralin and 18 g of pre-sulphided NiMo/Al$_2$O$_3$ catalyst.

For this test, the green algae were previously dried at 110° C. for 2 hours, ground and sieved so as to obtain particles smaller than 100 microns (cf. simplified composition in Table 8). The inorganic matter essentially comprises ash, salts, minerals and metals.

TABLE 8

Simplified composition of the feed of algae

| water | % w/w | 4.6 |
|---|---|---|
| Organic C | % w/w | 35.8 |
| Organic H | % w/w | 5.9 |
| Organic O | % w/w | 36.3 |
| Organic N | % w/w | 2.7 |
| Organic S | % w/w | 0.2 |
| inorganic matter | % w/w | 14.5 |

Hydroliquefaction was carried out under the same operating conditions as described in Example 1. The mass of solids obtained from the algae is the difference between the quantity of solids recovered (after washing and drying) and the mass of catalyst charged. The mass of solids obtained from the algae makes it possible to calculate the conversion of the algae introduced according to formula 1.

An additional experiment using the same feed quantities was also carried out under the conditions of the first stage, stopping at the first stage so as to recover and analyse the liquid fraction, and estimate the conversion at the end of this first stage. Numerical application of formula 1 is presented in Table 9.

TABLE 9

Calculation of conversion

|  |  | stage | |
|---|---|---|---|
|  |  | 1 | 2 |
| initial feed of algae | g | 72 | |
| solids from the algae | g | 16 | 10.5 |
| conversion | % w/w | 77.8 | 85.4 |

Elemental analysis was carried out on the liquids obtained (cf. Table 10).

TABLE 10

Elemental analysis of the liquid fraction obtained

|  |  | stage | |
|---|---|---|---|
|  |  | 1 | 2 |
| Organic C | % w/w | 86.9 | 88.8 |
| Organic H | % w/w | 10.6 | 11.0 |
| Organic O | % w/w | 0.9 | 0.2 |

Note: the small difference in hydrogen content between stage 1 and stage 2 arises from the fact that the liquid fraction is heavily diluted in tetralin (and the decalin formed by hydrogenation) after reaction. The same, applies, to a lesser degree, to the oxygen content. At the end of stage 1, the sum of the C H, O contents is less than 100% and this is in particular attributable to the residual presence of nitrogen and sulphur.

The degree of deoxygenation is calculated according to formula 2. Numerical application of formula 2 is presented in Table 11.

TABLE 11

Calculation of deoxygenation

| | | stage | |
|---|---|---|---|
| | | 1 | 2 |
| Feed of algae | g | | 72 |
| Organic O in feed | % w/w | | 36.3 |
| Organic O in feed | g | | 26.1 |
| Liquid fraction | g | 175 | 178 |
| Organic O in liquid fraction | % w/w | 0.9 | 0.2 |
| Organic O in liquid fraction | g | 1.6 | 0.4 |
| degree of deoxygenation of algae | % w/w | 93.9 | 98.5 |

The liquid fraction was distilled so as to remove the tetralin and decalin (formed by partial hydrogenation of tetralin). Liquids having boiling points strictly below and strictly above those of tetralin and decalin were grouped together. The mass of liquid obtained makes it possible to calculate a yield of liquids obtained from the algae relative to the mass of algae introduced. The yield of gases obtained from the algae can be estimated from the difference between the conversion and the yield of liquids (cf. Table 12)

TABLE 12

Calculation of the yields of liquids and gases obtained from the algae

| | | stage | |
|---|---|---|---|
| | | 1 | 2 |
| Initial feed of algae | g | | 72 |
| Liquids obtained from the algae | g | 31.5 | 34.3 |
| Yield of liquids obtained from the algae | % w/w | 43.8 | 47.8 |
| Conversion | % w/w | 77.8 | 85.4 |
| Yield of gases obtained from the algae | % w/w | 34.0 | 37.6 |

Spot analyses showed that these gases obtained from the algae essentially light hydrocarbons with 1 to 4 carbon atoms, water, carbon monoxide and carbon dioxide, hydrogen sulphide and ammonia.

The liquid obtained after removal of the solvent was subjected to elemental analysis to determine the contents of C, H and O (cf. Table 13), as well as gas chromatography makes it possible to obtain simulated distillation. The use of simulated distillation makes it possible to estimate the selectivities of different cuts present in the liquid obtained from the algae after removal of the solvent (cf. Table 14). Recycling of a part of the fraction 177° C.+ will provide a further increase in yield in a gasoline type cut.

TABLE 13

Elemental analysis of the liquid obtained from the algae after removal of the solvent

| | | stage | |
|---|---|---|---|
| | | 1 | 2 |
| Organic C | % w/w | 80.4 | 83.3 |
| Organic H | % w/w | 14.6 | 15.9 |
| Organic O | % w/w | 5.0 | 0.8 |

TABLE 14

Selectivities of liquid cuts obtained from the biomass

| | | stage | |
|---|---|---|---|
| | | 1 | 2 |
| IP-177° C. | % w/w | 94.1 | 92.5 |
| 177° C.+ | % w/w | 5.9 | 7.5 |

These examples show that under these conditions, the biomass can be converted to upgradeable liquids and gases. The high level of deoxygenation leads to liquids with low oxygen content, which can therefore be upgraded to fuel bases or to chemical intermediates optionally after additional refining stages and/or by mixing with cuts of petroleum origin or derived from coal or obtained from Fischer-Tropsch synthesis.

By varying the operating conditions, it is possible to obtain different selectivities for gases and liquids. The present invention aims to maximize the selectivity for liquids of improved quality (low oxygen content and increased hydrogen content) by using at least two reactors operating at different temperatures. The experiment in the example was carried out in two stages and removal of the vapour phase between the two stages can be likened to the role of the inter-stage separator in the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding FR application Ser. No. 10/00.097, filed Jan. 12, 2010, and of corresponding FR application Ser. No. 10/00.574, filed Feb. 11, 2010, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Process for hydroliquefaction of biomass selected from algae, lignocellulosic biomass and/or of one or more constituents of lignocellulosic biomass selected from the group comprising cellulose, hemicellulose and/or lignin for producing fuel bases comprising
   a) a stage of preparation of a suspension of particles of biomass in a solvent,
   b) a first stage of hydroconversion in the presence of hydrogen of said suspension in at least one reactor containing an ebullating bed catalyst and operating at a temperature comprised between 300° C. and 440° C., at a total pressure comprised between 15 and 25 MPa, at an hourly mass velocity comprised between 0.1 and 5 $h^{-1}$ and at a hydrogen/feed ratio comprised between 0.1 and 2 $Nm^3$/kg,
   c) a second stage of hydroconversion in the presence of hydrogen of at least a proportion of effluent obtained in stage b) in at least one reactor containing an ebullating bed catalyst and operating at a temperature comprised between 350° C. and 470° C., at a total pressure comprised between 15 and 25 MPa, at an hourly mass velocity comprised between 0.1 and 5 $h^{-1}$ and a hydrogen/feed ratio comprised between 0.1 and 2 $Nm^3$/kg, and wherein the temperature of the second hydroconversion stage is at least 10° C. higher than that of the first hydroconversion stage.

2. Process according to claim 1, characterized in that the first hydroconversion stage takes place at a temperature between 325° C. and 375° C. and at a total pressure comprised between 16 and 20 MPa, and in that the second hydroconversion stage takes place at a temperature comprised between 350° C. and 425° C. and at a total pressure comprised between 16 and 20 MPa.

3. Process according to claim 1, characterized in that the lignocellulosic biomass and/or one or more constituents of the lignocellulosic biomass selected from the group comprising cellulose, hemicellulose and/or lignin undergo a pretreatment comprising at least one of the following stages:
   a) a drying stage carried out at a temperature below 250° C., and/or a stage of roasting, said roasting being carried out at a temperature comprised between 200 and 300° C., in the absence of air,
   b) a grinding stage.

4. Process according to claim 1, wherein the biomass is algae in which the algae are subjected to a pre-treatment comprising at least one of the following stages:
   a) a demineralization stage,
   b) a drying stage carried out at a temperature below 250° C.,
   c) a grinding stage.

5. Process according to claim 1, characterized in that the particles of biomass have a water content of 1 to 50%, and a particle size less than 600 microns.

6. Process according to claim 1, characterized in that said solvent comprises vacuum distillate, and optionally atmospheric distillate, the solvent/biomass weight ratio being from 0.1 to 3, said solvent being a solvent obtained from a separation stage carried out after the two hydroconversion stages, said solvent being recycled upstream of the two hydroconversion stages.

7. Process according to claim 1, characterized in that said biomass is co-processed with a feed selected from petroleum residues, petroleum crudes, synthetic crudes, topped petroleum crudes, deasphalted oils, resins from deasphalting, asphalts from deasphalting, derivatives from petroleum processing, bituminous sands or their derivatives, bituminous shales or their derivatives, coal or liquefied products obtained from coal by hydroliquefaction, hydrocarbon and/or polymer industrial waste, household organic or plastic waste, vegetable or animal oils and fats, tars and residues that can be upgraded with difficulty or not at all, originating from gasification of biomass, coal or petroleum residues, charcoal, pyrolysis oil or mixtures of said feeds.

8. Process according to claim 1, characterized in that said catalyst comprises a group VIII metal selected from the group comprising Ni, Pd, Pt, Co, Rh and/or Ru, optionally a group VIB metal selected from the group Mo and/or W, on an amorphous mineral support selected from the group comprising alumina, silica, silica-aluminas, magnesia, clays and mixtures of at least two of these minerals.

9. Process according to claim 1, characterized in that the effluent obtained at the end of the first hydroconversion stage is subjected to separation of the light fraction and at least a proportion, preferably all, of the residual effluent is treated in the second hydroconversion stage.

10. Process according to claim 1, characterized in that the effluent obtained at the end of the second hydroconversion stage undergoes a separation stage for separating a gaseous phase, an aqueous phase, at least one light fraction of liquid hydrocarbons of the naphtha, kerosene and/or diesel type, a vacuum gas oil heavy fraction of hydrocarbons, a vacuum residue fraction and a solid fraction that can be in the vacuum residue.

11. Process according to claim 10, wherein the separation stage provides the vacuum gas oil heavy fraction of hydrocarbons which is then recycled wholly or partly to the stage (a) for preparation of a suspension.

12. Process according to claim 10, characterized in that at least partially the light fraction(s) and/or the heavy fraction obtained after separation undergo a hydrotreating and/or hydrocracking stage.

13. Process according to claim 1, characterized in that at least a proportion of the effluent obtained at the end of the second hydroconversion stage directly undergoes a hydrotreating and/or hydrocracking stage without intermediate decompression.

14. Process according to claim 1, characterized in that the spent catalyst from the second hydroconversion stage is passed wholly or partly directly to the first hydroconversion stage.

15. A process according to claim 1, wherein said solvent in step (a) is a hydrogen donor solvent.

16. A process according to claim 1, further comprising fractionating the resultant hydroliquefaction of biomass output to yield a hydrogen donor solvent, and passing said hydrogen donor solvent to stage (a), facilitating passage of said suspension to said reaction zone in step (b), and by hydrogen transfer to resultant products, ensuring a conversion to liquid by minimizing solids and gases formed in the reaction zone.

17. A process according to claim 3, wherein the drying stage in step (a) is conducted at below 200° C. and the roasting is conducted at between 225° C. and 275° C.

18. A process according to claim 5, wherein the drying stage is conducted at a temperature below 200° C.

19. A process according to claim 5, wherein the particles of biomass have a water content of 5 to 10% and a particle size less than 150 microns.

20. A process according to claim 6, wherein said solvent comprising vacuum gas oils (VGO).

21. A process according to claim 20, said solvent being obtained from a separation stage carried out after the two hydroconversion stages, said solvent being recycled upstream of the two hydroconversion stages.

22. A process according to claim 1, wherein said solvent in step (a) is a hydrogen donor solvent obtained by a step comprising fractionating the resultant hydroliquefaction of biomass output to yield said hydrogen donor solvent, and passing said hydrogen donor solvent to stage (a), facilitating passage of said suspension to said reaction zone in step (b), and by hydrogen transfer to resultant products, ensuring a conversion to liquid by minimizing solids and gases formed in the reaction zone, wherein the drying stage in step (a) is conducted at below 200° C. and the roasting is conducted at between 225° C. and 275° C.,
   wherein the particles of biomass have a water content of 5 to 10% and a particle size less than 150 microns,
   wherein said solvent comprises vacuum gas oils (VGO), said solvent being obtained from a separation stage carried out after the two hydroconversion stages (b) and (c), said solvent being recycled upstream of the two hydroconversion stages.

23. A process according to claim 1, wherein the biomass comprises green algae suspended in tetralin and wherein the catalyst is presulfided $NiMo/Al_2O_3$.

* * * * *